(12) United States Patent
Jabori (10) Patent No.: US 10,339,092 B2
(45) Date of Patent: Jul. 2, 2019

(54) WIRELESS GIGABIT ALLIANCE (WIGIG) ACCESSORIES

(71) Applicant: Hewlett-Packard Development Company, L.P., Houston, TX (US)

(72) Inventor: Monji G Jabori, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/563,251

(22) PCT Filed: Jul. 31, 2015

(86) PCT No.: PCT/US2015/043218
§ 371 (c)(1),
(2) Date: Sep. 29, 2017

(87) PCT Pub. No.: WO2017/023263
PCT Pub. Date: Feb. 9, 2017

(65) Prior Publication Data
US 2018/0129625 A1    May 10, 2018

(51) Int. Cl.
*G06F 13/20*    (2006.01)
*G06F 13/42*    (2006.01)
*G06F 13/40*    (2006.01)

(52) U.S. Cl.
CPC ...... *G06F 13/4282* (2013.01); *G06F 13/4022* (2013.01); *G06F 13/42* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | |
|---|---|---|
| 2012/0063376 A1 | 3/2012 | Kambhatla et al. |
| 2013/0034184 A1 | 2/2013 | Roh |
| 2014/0029611 A1 | 1/2014 | Huang et al. |
| 2014/0059264 A1 | 2/2014 | Sudak |
| 2014/0143436 A1 | 5/2014 | Sadeghi et al. |
| 2014/0177742 A1 | 6/2014 | Maltsev et al. |
| 2014/0189172 A1 | 7/2014 | Sadeghi et al. |
| 2015/0046622 A1 | 2/2015 | Ramirez et al. |
| 2015/0242353 A1* | 8/2015 | Kawai ................ G06F 13/385 710/33 |

(Continued)

OTHER PUBLICATIONS

Wikipedia, Wireless WAN, Oct. 2011, p. 1-2.*

(Continued)

*Primary Examiner* — Henry Tsai
*Assistant Examiner* — Dean Phan
(74) *Attorney, Agent, or Firm* — Brooks, Cameron & Huebsch, PLLC (57) ABSTRACT

Example implementations relate to wireless gigabit alliance (WiGig) enabled computing systems including WiGig accessories. In one example, a WiGig accessory includes a connector to couple the WiGig accessory to a universal serial bus (USB) port of a computing device that is separate and distinct from the WiGig accessory, and a WiGig component to form a WiGig enabled communication system having a wireless peripheral component interconnect express (PCIe) communication capability when coupled to the computing device.

14 Claims, 4 Drawing Sheets

(56) References Cited

U.S. PATENT DOCUMENTS

2016/0170929 A1* 6/2016 Pethe .................. G06F 13/102
                                                         710/313

OTHER PUBLICATIONS

Radio-electronics.com, IEEE 802.11ad Microwave WiFi/WiGig Tutorial, Dec. 2014, p. 1-2.*
Ivan Marsic, Digital Logic Design, 2013, pp. 1-16 (Year: 2013).*
Stephen Shankland, "60GHz tech promises wireless docking, USB, HDMI," Jun. 28, 2011, pp. 1-4, cnet.com, CBS Interactive Inc.
Yaron, Elboim et al, The Future of Wireless Technology in Here: Introducing "Truly Wirelss", Jan. 22, 2013.

* cited by examiner

WIRELESS GIGABIT ALLIANCE (WIGIG) ACCESSORIES

BACKGROUND

Wireless gigabit alliance (WiGig) and institute of electronic and electrical engineers (IEEE) 802.1 lad are wireless communication standards associated with using a wireless wave band of 60 gigahertz. WiGig communication may transmit and/or receive data at desirable rates as compared to data transmission rates of other communication types such as Wi-Fi communication. For example, Wigig communication may enable communication apparatuses to directly and wirelessly communicate with each other via WiGig communication.

DETAILED DESCRIPTION

Wireless gigabit alliance (WiGig) or institute of electronic and electrical engineers (IEEE) 802.1 lad are wireless communication standards associated with using a wireless wave band of 60 gigahertz. WiGig communication may rely on a WiGig component such as a WiGig antenna and/or a WiGig chip to facilitate aspects of the WiGig communication. For instance, a WiGig chip can be a 60 gigahertz complementary metal-oxide semiconductor (CMOS) WiGig chip, among other suitable WiGig chips. A WiGig antenna refers to antennas and antenna arrays that can transmit and/or receive information operating in the 60 GHz frequency spectrum (i.e., DBand) as defined by the WiGig specification. The WiGig antennas and WiGig antenna arrays may be beam steerable or directed beam antennas or antenna arrays, among other possibilities.

Some example approaches to providing a WiGig component to a communication apparatus (e.g., a laptop) may rely a WiGig component being non-removably coupled (e.g., soldered) to a platform such as a printed circuit board (PCB) of a communication apparatus. Non-removably coupling the WiGig component to the platform can add to a base cost of the communication apparatus, increase difficulty to manufacture the communication apparatus, and/or reduce an amount of available area in which other components (e.g., a wireless local area network (WLAN) and/or a wireless wide area network (WWAN) antennas) can be coupled to the platform. Further, not all end users of the communication apparatus may desire to utilize such WiGig components and/or WiGig communication.

Examples of the disclosure are directed to WiGig accessories, WiGig enabled computing systems including WiGig accessories, and methods of forming the WiGig enabled computing systems including WiGig accessories. WiGig accessories refer to devices including a WiGig component that can form a WiGig enabled communication system having a wireless peripheral component interconnect express (PCIe) communication capability when coupled to a computing device. For example, a WiGig accessory can include a connector to couple the WiGig accessory to a universal serial bus (USB) port of a computing device that is separate and distinct from the WiGig accessory and a WiGig component to form a WiGig enabled communication system having a wireless PCIe communication capability when coupled to the computing device.

A WiGig enabled communication system refer a system having at least a PCIe communication capability (e.g., a PCIe communication capability and a DisplayPort communication capability) when coupled to a WiGig accessory. That is, a WiGig component is located in a WiGig accessory that is separate and distinct from a platform of the computing device. Locating the WiGig component off the platform of the computing device provides a comparatively greater amount of physical space on the platform of the computing device for other components such as antennas to be installed and provides for comparatively reduced costs associated with manufacture of the computing device. That is, a WiGig component (e.g., the WiGig antenna and/or a WiGig chip) are physically removed from a platform (e.g., a PCB) of the computing device and are instead capable of being removably coupled to the computing device to form a WiGig enabled communication system.

Figure 1:
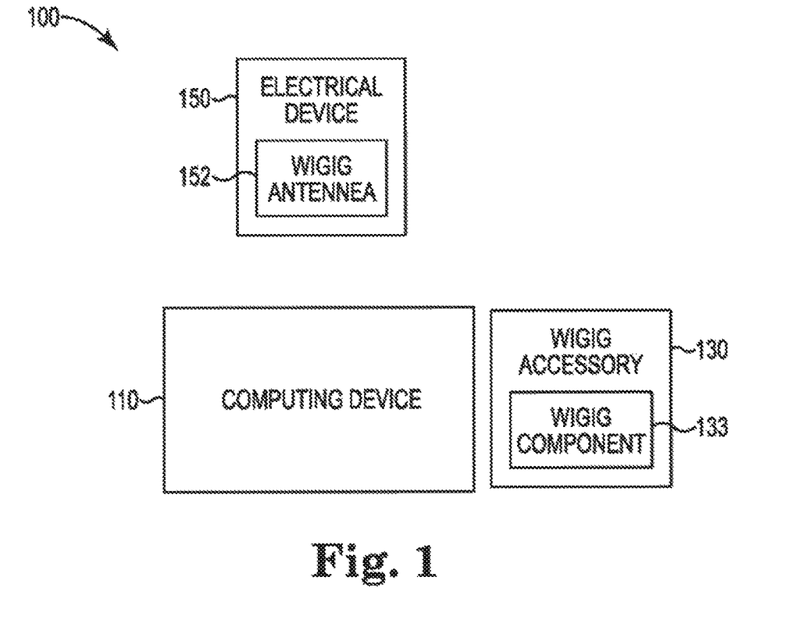
FIG. 1 illustrates a schematic view of an example of a wireless gigabit alliance (WiGig) enabled computing system including a WiGig accessory according to the disclosure.

FIG. 1 illustrates a schematic view of an example of a WiGig enabled computing system 100 including a WiGig accessory according to the disclosure. The Wigig enabled computing system 100 includes a computing device 110, a WiGig accessory 130 including a WiGig component 133, and an electronic device 150. The computing device 110 is analogous to computing device 210 referenced by FIG. 2 and the WiGig accessory 130 is analogous to WiGig accessory 330 referenced by FIG. 3.

The computing device 110 refers to an electronic device suitable to process information and perform WiGig communication when coupled to a WiGig accessory, as described herein. The computing device 110 may not include a WiGig antenna and/or may not include a WiGig chip in an effort to ease manufacture of the computing device 100, provide additional physical real estate on the computing device 110 for other components, and/or to comparatively reduce a cost associated with manufacture of the computing device 110 as compared to other computing devices that may include a WiGig antenna and/or a WiGig chip. That is, the computing device 110 may not be capable of performing WiGig communication when decoupled from a WiGig accessory due at least in part to the computing device including various components other than a WiGig antenna and/or a WiGig chip. Examples of computing devices can include mobile devices, payment instruments, tablets, desktop computers, and/or laptop computers, among other types of computing devices that can form a WiGig enabled communication system having a wireless PCIe communication capability when coupled to a WiGig accessory.

Figure 2:
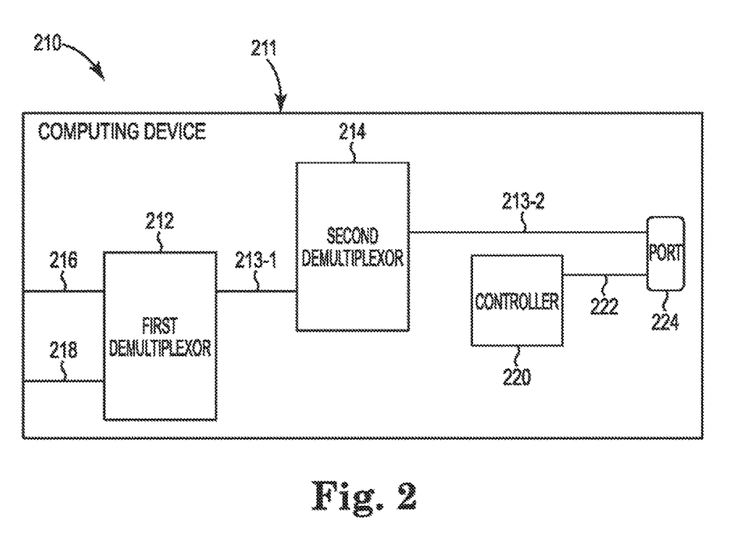
FIG. 2 illustrates schematic view of an example of a portion of computing device included in the WiGig enabled computing system of FIG. 1 according to the disclosure.

The computing device includes a first demultiplexor and a second demultiplexor, as described herein with greater detail at FIG. 2. Notably, the second demultiplexor is coupled to a PCIe bus (not shown) of the computing device 110 to form a WiGig path extending from the PCIe bus through the second demultiplexor. That is, the presence of the second demultiplexor in the computing device 110 can permit formation of the WiGig enabled communication system 100. For example, the WiGig path can extend from the PCIe bus through the second demultiplexor to the WiGig component 133 (e.g., WiGig chip and/or a WiGig antenna) when the WiGig accessory 130 is coupled to the computing device 110 to form the WiGig enabled communication system 100 having a wireless PCIe communication capability. If the second demultiplexor were not present in the computing device 110 the WiGig enabled communication system may not be formed. Formation of a WiGig path and/or non-removably coupling a WiGig accessory 130 to computing device 110 can comparatively increase an amount of available area in which other components can be coupled to a platform (e.g., a PCB) of the computing device 110. For instance, the computing device 110 can include WLAN and/or WWAN antennas coupled to a platform of the computing device 110.

The WiGig accessory 130 is a dongle or other device that can removably coupled (e.g., via a USB plug) to the computing device 110 (e.g., coupled to a USB port of the computing device) and form the WiGig enabled communication system 100 when removably coupled to the computing device 110. As mentioned, the WiGig accessory 130 includes a WiGig component 133. The WiGig component 133 can include a WiGig antenna that can communicate wireless PCIe information and/or can include a WiGig chip. The WiGig chip is compliant with the IEEE 802.1 lad standard and/or a Wireless gigabit alliance, among other possibilities. That is, the WiGig enabled communication system 100 can wirelessly transmit and/or receive PCIe communication to and/or from the electronic device 150. In some examples, the WiGig enabled communication system 100 can have both the wireless PCIe communication capability and a wireless DisplayPort (DP) communication capability when coupled to the computing device. For example, the WiGig communication system 100 can enable wireless docking of the computing device 110 when coupled to the WiGig accessory by pass through both wireless PCIe and wireless DP to the electronic device (e.g., a docking station and/or a monitor). However, the present disclosure is not so limited. Rather, WiGig communication via the WiGig enabled communication system 100 can, in some examples, include utilization of a PCIe communication capability of the WiGig enabled communication system 100 and not employ a wireless DP capability.

The WiGig accessory 130 and the computing device 110 are separate and distinct. Being separate and distinct refers to being physically separate and having separate resources. That is, when coupled the WiGig accessory 130 and the computing device 110 can form the WiGig enabled communication system 100.

The electronic device 150 refers to displays (e.g., monitors, televisions, etc.) mobile devices, payment instruments, tablets, desktop computers, and/or laptop computers, among other types of electronic devices that can transmit and/or receive WiGig communications such as wireless PCIe and/or wireless DP communications. As illustrated in FIG. 1, the electronic device 150 includes WiGig antenna 152. The WiGig antenna 152 can be similar or analogous to a WiGig antenna included in the WiGig accessory 130. For instance, the WiGig antenna 152 can refer to antennas and antenna arrays that can transmit and/or receive information operating in the 60 GHz frequency spectrum as defined by the WiGig specification. The WiGig antennas and WiGig antenna arrays may be beam steerable, or directed beam antennas or antenna arrays, among other possibilities.

FIG. 2 illustrates schematic view of an example of a portion of computing device 210 included in the WiGig enabled computing system of FIG. 1 according to the disclosure. As illustrated in FIG. 2, the computing 210 includes an outer housing 211 including a port 224 that is in communication with a controller 220 via a communication channel 222 and the port 224 is in communication with a first demultiplexor 212 and a second demultiplexor 214. The first demultiplexor 212 and the second demultiplexor 214 are demultiplexors (e.g., high-speed demultiplexors capable of operation at comparatively higher speeds than other demultiplexors which may not be suitable for WiGig communication) that are suitable to provide WiGig communication. As mentioned, the WiGig path can extend from a PCIe bus (not shown) through the second demultiplexor 214 to a WiGig component (e.g., WiGig chip and/or a WiGig antenna) included in a WiGig accessory when the WiGig accessory is coupled to the computing device 210 to form the WiGig enabled communication system having a wireless PCIe communication capability. The second demultiplexor can be in communication with a DP channel (not shown) to pass through DP to the port 224. That is, the second demultiplexor can pass though DP (e.g., DPx2 or DPx4) and/or PCIe. For example, DPx4 can be passed through the second demultiplexor and the port 224 to (e.g., to and/or from) an electronic device when the WiGig enabled system, as described herein, is formed.

A PCIe communication can be communicated from the PCIe bus via the PCIe channel 216 to the first demultiplexor 212. Similarly, a USB communication (e.g., a USB 3.0 or other version of USB) can be communicated via a USB channel 218 to the first demultiplexor 212. As a result, the first demultiplexor can pass PCIe communication and/or USB communication to the second demultiplexor 214. Notably, a PCIe communication can be communicated via a portion of the WiGig path 213-1 to the second demultiplexor 214. Such a communication can be communicated from the second demultiplexor 214 via a portion of the WiGig path 213-2 to the port 224. That is, a portion of the WiGig path is illustrated as 213-1 and 213-2 in FIG. 2. The port 224 can operate based on instructions received from the controller 220, among other possibilities.

The controller 220 can include hardware components and/or computer-readable and executable instructions to form a WiGig path and/or to promote communication of information via the WiGig path, among other possibilities. The instructions (e.g., software, firmware, programming, etc.) may be stored in a memory resource (e.g., computer-readable medium) or as a hard-wired program (e.g., logic). For example, the controller 220 can include a number of engines can include a combination of hardware and instructions to perform a number of functions described herein (e.g., form a WiGig enabled computing system having a WiGig path extending from the PCIe bus through the second demultiplexor to the WiGig component of the WiGig accessory and enable wireless PCIe communication between the WiGig enabled computing system and an electronic device, etc.). Each of the engines can include hardware or a combination of hardware and instructions. The controller 220 can be implemented on a computing device and/or a collection of computing devices, on a WiGig accessory and/or a collection of WiGig accessories, and/or on a combination of a computing device and a WiGig accessory.

The port 224 can be a type-C USB port. A type-C USB port can operate in a plurality of modes including a USB mode, a DP mode (e.g., with shared USB and DP), and notably, a WiGig mode. When in the WiGig mode, the type-C USB can facilitate WiGig communication. For instance, the type-C USB can enter a WiGig mode and/or form a WiGig path in response to receipt of a WiGig vender defined message (VDM) that puts the type-C USB port into the WiGig mode and/or cause formation (e.g., completion) of the WiGig path to occur.

Figure 3:
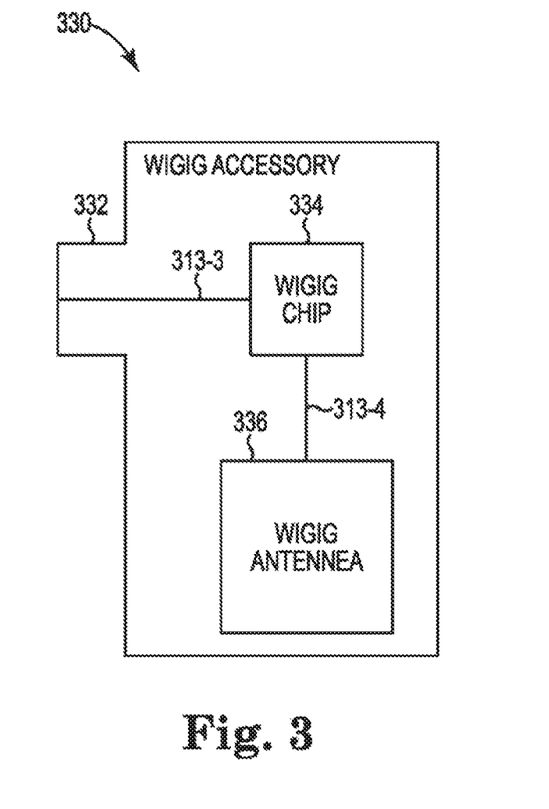
FIG. 3 illustrates schematic view of an example of a portion of a WiGig accessory included in the WiGig enabled computing system of FIG. 1 according to the disclosure.

FIG. 3 illustrates schematic view of an example of a portion of a WiGig accessory 330 included in the WiGig enabled computing system of FIG. 1 according to the disclosure. The WiGig accessory 330 is a dongle or other device that can removably couple to the computing device 110 and form the WiGig enabled communication system 100 when removably coupled to the computing device 110.

As illustrated in FIG. 3, the WiGig accessory 330 can include plug 332, WiGig chip 334, and WiGig antenna 336. In various examples, a WiGig component, as described herein, includes at least one of the WiGig chip 334 and/or the WiGig antenna 336. For instance, as illustrated in FIG. 3, a WiGig component (not shown for ease of illustration) of the WiGig accessory 330 can include both the WiGig chip 334 and the WiGig antenna 336. However the present disclosure is not so limited. That is, the WiGig accessory 330 can include a WiGig antenna but not a WiGig chip or can include a WiGig chip but not a WiGig antenna. For example, when the WiGig accessory includes a WiGig chip but does not include a WiGig antenna a computing device and/or another WiGig accessory can include a WiGig antenna, among other possibilities to promote formation of a WiGig enabled communication system. Similarly, when the WiGig accessory 330 includes a WiGig antenna but does not include a WiGig chip the computing device and/or another WiGig accessory can include a WiGig chip, among other possibilities to promote formation of a WiGig enabled communication system.

As mentioned, the WiGig antenna 336 refers to WiGig antennas and WiGig antenna arrays may be beam steerable, or directed beam antennas or antenna arrays. Such WiGig antennas and WiGig antenna arrays may be planar, three dimensional, or other configurations, among other possibilities.

The WiGig antenna 336 can be connected to separate transmit and receive chains, or a combined transmit and receive switch. The WiGig antenna arrays can include a number of elements, and antenna array elements may be arranged to form a one or two dimensional array. The WiGig antenna 336 can radiate or transmit radio waves perpendicular to array orientation (e.g., radiating in the z-axis to a Wigig antenna array arranged in the y-axis, or radiating in the z-axis to a planar antenna array arranged in the x-y plane). Such radiation may be referred to as broadside radiation. In certain implementations, a WiGig antenna 336 can radiate or transmit radio waves in the same directions as the array orientation (e.g., radiating in the y-axis to a WiGig antenna array arranged in the y-axis, or radiating on the x-y plane to planar antenna array arranged in the x-y plane). Such radiation may be referred to as end fire radiation. That is, the WiGig antennas and antenna arrays may provide for broadside and/or end fire radiation, among other possibilities. In any case, the WiGig antenna 336 is physically removed from a platform (e.g., a PCB) of a computing device (e.g., computing device 110 as illustrated in FIG. 1) and is instead capable of being removably coupled to the computing device (e.g., to a port of the computing device).

As mentioned, the WiGig chip 334 can be a 60 gigahertz CMOS WiGig chip, among other suitable WiGig chips. The plug 336 can be a USB plug such a type-C USB plug suitable to removably couple with a type-C USB port included in a computing device, among other possibilities.

A portion of a WiGig path illustrated as 313-3 and 313-4 can be included in the WiGig accessory. For instance, when the WiGig accessory is removably coupled to a computing device (e.g., computing device 210 as illustrated in FIG. 2), a WiGig enabled computing system can be formed using at least such a portion of a WiGig path. For example, a WiGig enabled computing system can have a WiGig path extending from a PCIe bus through a second demultiplexor to the WiGig component via the portion of the WiGig path included in the WiGig accessory to enable wireless PCIe communication between the WiGig enabled computing system and an electronic device (e.g., electronic device 150 as illustrated in FIG. 1).

Figure 4:
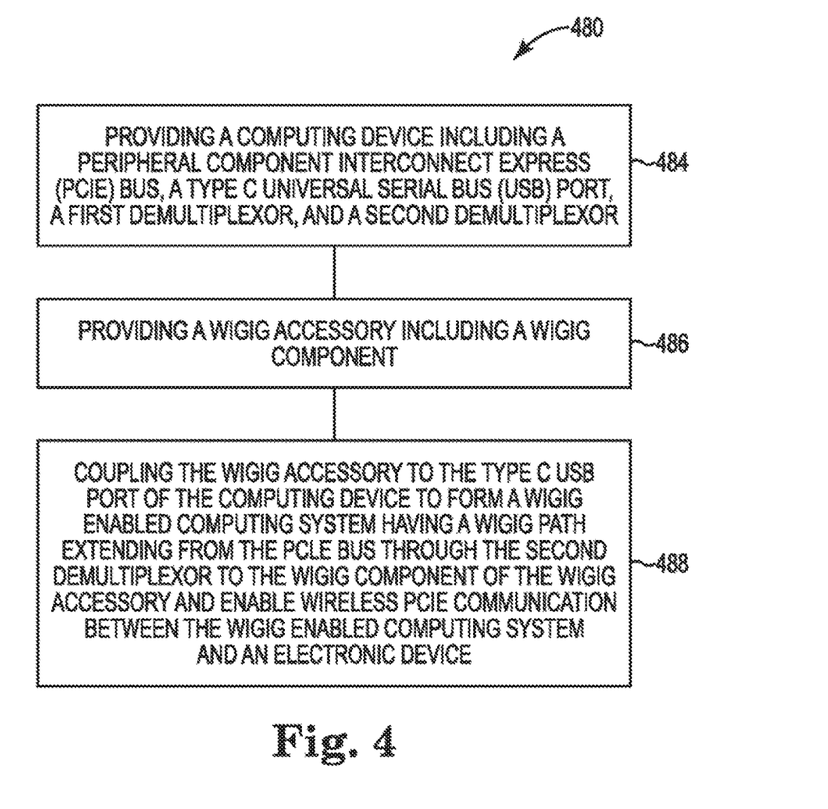
FIG. 4 illustrates a flow diagram of an example of a method of forming a WiGig enabled computing system including a WiGig accessory according to the disclosure.

FIG. 4 illustrates a flow diagram of an example of a method of forming a WiGig enabled computing system including a WiGig accessory according to the disclosure. As illustrated at 484, the method 480 can include providing a computing device including a PCIe bus, a type-C USB port, a first demultiplexor, and a second demultiplexor. Similarly, the method 480 can include providing a WiGig accessory including a WiGig component, as illustrated at 486. Providing can include manufacture of and/or otherwise procuring the computing device and the WiGig accessory.

As illustrated at 488, the method 480 can include coupling the WiGig accessory to the type-C USB port of the computing device to form a WiGig enabled computing system having a WiGig path extending from the PCIe bus through the second demultiplexor to the WiGig component of the WiGig accessory and enable wireless PCIe communication between the WiGig enabled computing system and another device. As mentioned, the WiGig path can enable WiGig communication with the electronic device.

In some examples, the method 480 can include including forming the WiGig path in response to receipt of a WiGig VDM that puts the type-C USB port into a WiGig mode and forms the WiGig path. The WiGig VDM refers to instructions that cause the type-C USB port to enter a WiGig mode (enabling WiGig communication via the type-C USB port). For example, receipt of such a WiGig VDM by the type-C USB port can occur in response (e.g., automatically without a user request) to coupling the WiGig accessory and/or place the type-C USB connecting in a WiGig mode automatically.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 105 may refer to element 110 in FIG. 1 and an analogous element may be identified by reference numeral 210 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a number of" an element and/or feature can refer to one or more of such elements and/or features.

What is claimed:

1. A wireless gigabit alliance (WiGig) accessory, comprising:
a connector to couple the WiGig accessory to a universal serial bus (USB) port of a computing device that is separate and distinct from the WiGig accessory, wherein the USB port operates in a plurality of modes, and in response to receiving a message, the WiGig accessory puts the USB port into a WiGig mode and forms a WiGig path;
a WiGig component to form a WiGig enabled communication system having a wireless peripheral component interconnect express (PCIe) communication capability when coupled to the computing device; and
wherein the computing device comprises a PCIe bus, a first demultiplexor directly coupled to the PCIe bus, and a second demultiplexor directly coupled to the first demultiplexor such that the first demultiplexor is between the PCIe bus and the second demultiplexor to enable wireless PCIe communication between the WiGig enabled computing system and an electronic device via the WiGig path.

2. The WiGig accessory of claim 1, wherein the WiGig component comprises a WiGig antenna to communicate wireless PCIe information.

3. The WiGig accessory of claim 1, wherein the WiGig component comprises a WiGig chip, and wherein the WiGig chip is compliant with the institute of electronic and electrical engineers (IEEE) 802.1 lad standard.

4. The WiGig accessory of claim 1, wherein the WiGig chip is to form a WiGig enabled communication system having both the wireless PCIe communication capability and a wireless DisplayPort (DP) communication capability when coupled to the computing device.

5. The WiGig accessory of claim 1, wherein the first demultiplexor is to pass communications to the second demultiplexor from the PCIe bus.

6. The WiGig accessory of claim 1, wherein the WiGig accessory comprises a dongle that is to removably couple to the computing device and form a WiGig enabled communication system when removably coupled to the computing device.

7. A wireless gigabit alliance (WiGig) enabled computing system:
a computing device including a peripheral component interconnect express (PCIe) bus, a type-C-universal serial bus (USB) port, a first demultiplexor, and a second demultiplexor wherein the USB port operates in a plurality of modes, and in response to receiving a message, that the WiGig enabled computing system puts the USB port into a WiGig mode and forms a WiGig path;
a WiGig accessory including a WiGig component to pass information via the WiGig path extending from the PCIe bus through the second demultiplexor to the WiGig component when the WiGig accessory is removably coupled to the USB port of the computing device to enable wireless PCIe communication between the WiGig enabled computing system and an electronic device; and
wherein the first demultiplexor is to pass the information to the second demultiplexor from the PCIe bus.

8. The system of claim 7, wherein the WiGig accessory and the computing device are separate and distinct.

9. The system of claim 7, wherein the WiGig component includes at least one of a WiGig antenna and a WiGig chip.

10. The system of claim 7, wherein the WiGig component comprises a WiGig antenna and wherein the WiGig path extends from the PCIe bus through the first demultiplexor to the second demultiplexor and through the second demultiplexor to the WiGig antenna when the WiGig accessory is removably coupled to the type-C USB port of the computing device to enable wireless PCIe communication via the WiGig antenna between the WiGig enabled computing system and a WiGig antenna included in the electronic device.

11. The system of claim 7, wherein the WiGig component comprises both a WiGig antenna and a WiGig chip.

12. The system of claim 7, wherein the computing device includes both a wireless local area network (WLAN) antenna and wireless wide area network (WWAN) antenna.

13. A method of forming a wireless gigabit alliance (WiGig) enabled computing system, comprising:
providing a computing device including a peripheral component interconnect express (PCIe) bus, a type-C universal serial bus (USB) port, a first demultiplexor, and a second demultiplexor, wherein the USB port operates in a plurality of modes, and in response to receiving a message, the WiGig enabled computing system puts the USB port into a WiGig mode and forms a WiGig path;
providing a WiGig accessory including a WiGig component; and
coupling the WiGig accessory to the type-C USB port of the computing device to form a WiGig enabled computing system having the WiGig path extending from the PCIe bus through the first demultiplexor to the second demultiplexor and through the second demultiplexor to the WiGig component of the WiGig accessory and enable wireless PCIe communication between the WiGig enabled computing system and an electronic device.

14. The method of claim 13, including forming the WiGig path in response to receipt of a WiGig vender defined message that puts the type-C USB port into the WiGig mode.

* * * * *

UNITED STATES PATENT AND TRADEMARK OFFICE
CERTIFICATE OF CORRECTION

PATENT NO. : 10,339,092 B2
APPLICATION NO. : 15/563251
DATED : July 2, 2019
INVENTOR(S) : Monji G Jabori Page 1 of 1

It is certified that error appears in the above-identified patent and that said Letters Patent is hereby corrected as shown below:

In the Drawings

In sheet 1 of 4, reference numeral 152, Line 2, delete "ANTENNEA" and insert -- ANTENNA --, therefor.

In sheet 3 of 4, reference numeral 336, Line 2, delete "ANTENNEA" and insert -- ANTENNA --, therefor.

In the Claims

In Column 7, Line 35, Claim 3, delete "802.1 lad" and insert -- 802.11ad --, therefor.

In Column 8, Line 1, Claim 7, delete "message, that the" and insert -- message, the --, therefor.

Signed and Sealed this
Twenty-ninth Day of October, 2019

Andrei Iancu
*Director of the United States Patent and Trademark Office*